US012560155B2

(12) United States Patent
Wang

(10) Patent No.: US 12,560,155 B2
(45) Date of Patent: Feb. 24, 2026

(54) INFLATOR WITH UPPER COVER SHOWING PRESSURE VALUE

(71) Applicant: BETO ENGINEERING & MARKETING CO., LTD., Taichung (TW)

(72) Inventor: Lopin Wang, Taichung (TW)

(73) Assignee: BETO ENGINEERING & MARKETING CO., LTD., Taichung (TW)

( * ) Notice: Subject to any disclaimer, the term of this patent is extended or adjusted under 35 U.S.C. 154(b) by 59 days.

(21) Appl. No.: 18/405,158

(22) Filed: Jan. 5, 2024

(65) Prior Publication Data

US 2025/0223953 A1 Jul. 10, 2025

(51) Int. Cl.
| | |
|---|---|
| *F04B 33/00* | (2006.01) |
| *F04B 33/02* | (2006.01) |
| *F04B 53/00* | (2006.01) |
| *F04B 53/14* | (2006.01) |
| *G01D 5/00* | (2006.01) |
| *G01D 7/00* | (2006.01) |
| *G01L 7/00* | (2006.01) |
| *G01L 7/02* | (2006.01) |
| *G01L 19/08* | (2006.01) |
| *G01L 19/10* | (2006.01) |
| *G01L 19/16* | (2006.01) |

(52) U.S. Cl.
CPC ............ *F04B 33/005* (2013.01); *F04B 33/00* (2013.01); *F04B 33/02* (2013.01); *F04B 53/00* (2013.01); *F04B 53/14* (2013.01); *G01D 5/00* (2013.01); *G01D 7/00* (2013.01); *G01L 7/00* (2013.01); *G01L 7/022* (2013.01); *G01L 7/024* (2013.01); *G01L 19/08* (2013.01); *G01L 19/10* (2013.01); *G01L 19/16* (2013.01)

(58) Field of Classification Search
CPC ........ F04B 33/005; F04B 33/00; F04B 33/02; F04B 53/00; F04B 53/14; G01L 19/08; G01L 19/10; G01L 19/12; G01L 19/16; G01L 7/00; G01L 7/022; G01D 5/00; G01D 7/00; G01D 11/00; G01D 13/00
See application file for complete search history.

(56) References Cited

U.S. PATENT DOCUMENTS

| | | | | |
|---|---|---|---|---|
| 5,964,577 | A | * | 10/1999 | Chuang ................. F04B 33/005 |
| | | | | 417/63 |
| 9,677,965 | B2 | * | 6/2017 | Sahara .................... G01L 19/12 |
| 9,765,766 | B2 | * | 9/2017 | Kennedy Lageson ...................... |
| | | | | F04B 33/005 |
| 9,885,625 | B2 | * | 2/2018 | Wu .......................... F04B 53/14 |

(Continued)

*Primary Examiner* — Mary A Davis
(74) *Attorney, Agent, or Firm* — Guice Patents PLLC

(57) ABSTRACT

The invention provides an inflator with an upper cover showing a pressure value, comprising: a body with an air chamber, one end of the air chamber is an open end; an air outlet channel communicated with the air chamber; a push rod disposed in the air chamber; a driving unit provided with a driving part, the driving unit is communicated with the air outlet channel; an upper cover covered on the open end of the air chamber of the body; and a pressure display unit, the pressure display unit has a linkage part and a display part; the linkage part is linked with the driving part, and the display part is driven by the linkage part to produce a rotational position change with the push rod as an axis.

12 Claims, 8 Drawing Sheets

(56) References Cited

U.S. PATENT DOCUMENTS

| | | | |
|---|---|---|---|
| 2016/0377459 A1* | 12/2016 | Faeth ........................ | G01D 7/00 |
| | | | 116/292 |
| 2021/0215262 A1* | 7/2021 | Wang ...................... | F04B 33/00 |

* cited by examiner

INFLATOR WITH UPPER COVER SHOWING PRESSURE VALUE

FIELD OF THE INVENTION

The invention relates to an inflating device, more specifically refers to an inflator with an upper cover showing a pressure value, in which a pressure display unit is disposed in the upper cover for convenient reading of a pressure value.

DESCRIPTION OF THE RELATED ART

In order to allow the user to determine the inflated pressure value of a general inflator, a pressure gauge is installed on the inflator, or a pressure gauge is connected externally. When the inflator compresses the air, the user can judge whether the predetermined pressure value has been reached through the display of the pressure gauge, and it can be decided whether to continue the inflating action.

However, in conventional inflators, especially floor-standing inflators, the pressure gauge is usually located at the base or bottom, farthest from the user's eyes, so the user needs to interrupt the inflating action and get closer to the pressure gauge when observing the pressure value, otherwise the user cannot accurately observe the value displayed by the pressure gauge, resulting in errors in reading the pressure value of the inflator.

SUMMARY OF THE INVENTION

An object of the invention is to provide an inflator with an upper cover showing a pressure value, in which a pressure display unit is integrated in the upper cover of the inflator, so that changes in a numerical value can be easily observed.

An inflator with an upper cover showing a pressure value provided by the invention comprises:

a body with an air chamber, one end of the air chamber is an open end; an air outlet channel communicated with the air chamber;

a push rod having a pushing part and a rod body; the pushing part is disposed in the air chamber and capable of being actuated by the rod body to compress the air chamber;

a driving unit provided with a driving part, the driving unit is communicated with the air outlet channel to enable the driving part to operate by pressure changes of the air outlet channel; and an upper cover covered on the open end of the air chamber of the body, the upper cover is provided with a through hole for the rod body of the push rod to pass through; the upper cover is provided with a pressure display unit therein, the pressure display unit has a linkage part and a display part; the linkage part is linked with the driving part, and the display part is driven by the linkage part to produce a rotational position change with the through hole as an axis.

Through the above design, the pressure display unit of the invention can be disposed in the upper cover and uses a center of the push rod as an axis to produce an arc-shaped pressure value indication.

Preferably, the driving unit is a piston rod, the driving part is a rack, the linkage part is a gear; the piston rod is subjected to pressure changes of the air outlet channel to drive the rack of the driving part to displace/move, and the gear of the linkage part is driven to rotate by the rack of the driving part.

Preferably, the pressure display unit further comprises a conversion gear, the conversion gear has a large teeth portion and a small teeth portion, the large teeth portion meshes with the gear of the linkage part, and the small teeth portion meshes with the rack of the driving part.

Preferably, a coupling hole is provided in a center of the gear of the linkage part, and is coaxially disposed around a circumference of the through hole of the upper cover.

Preferably, the pressure display unit further comprises a holder, the conversion gear and the gear of the linkage part are pivotally disposed on the holder; the holder is fixed to the upper cover.

Preferably, the piston rod comprises a cylinder and a piston; the piston is slidably disposed in the cylinder, the cylinder is connected to the air outlet channel, the piston is capable of changing its position in the cylinder as a pressure of the air outlet channel changes; the rack of the driving part is disposed on the piston and changes its position along with the piston.

Preferably, the display part is a pointer, the pointer rotates with a center of the through hole of the upper cover as an axis; the upper cover is provided with a display window.

Preferably, the upper cover comprises a base and a cover body; the base is fixedly disposed on the open end of the body, the cover body is covered on the base, an accommodation space is formed between the base and the cover body; the pressure display unit and the driving unit are disposed in the accommodation space.

Preferably, the cover body is provided with a numerical value display panel therein at a position below the display window, and the pointer of the display part is disposed between the display window and the numerical value display panel.

Thereby, when the inflator performs an inflating action, a user can directly hold the push rod and directly observe pressure numerical value changes of the pressure display unit in the upper cover from a top, easy and direct observation is capable of reducing actions of observing pressure during inflating; and integrating the pressure display unit in the upper cover is capable of reducing an overall volume.

BRIEF DESCRIPTION OF DRAWINGS

In order to further understand the objects, features, and achieved efficacies of the invention, one preferred embodiment is described below for detailed explanation in conjunction with the drawings.

DETAILED DESCRIPTION OF THE INVENTION

Figure 1:
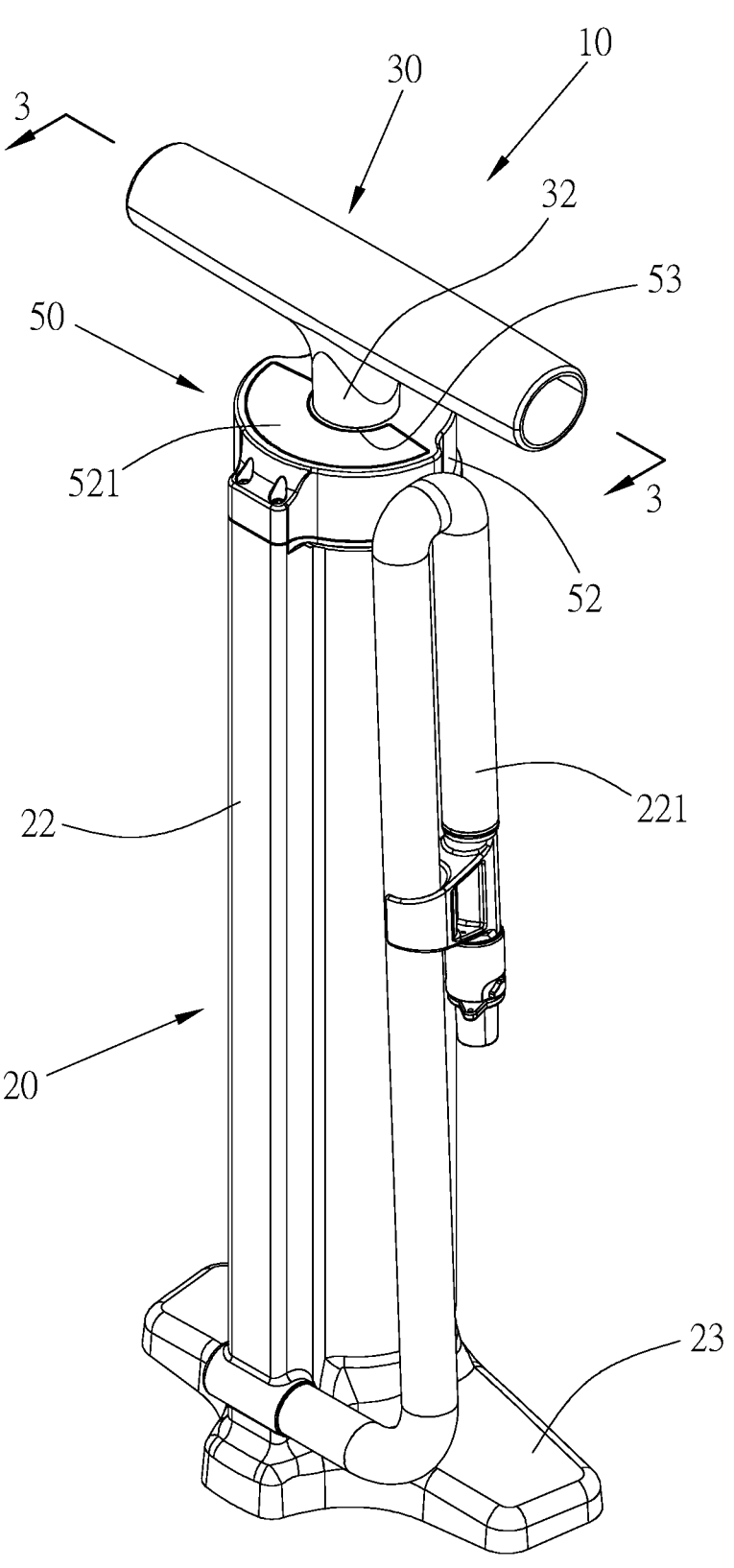
FIG. 1 is a perspective view of an inflator according to a preferred embodiment of the invention.

Please refer to FIGS. 1 to 6 for a preferred embodiment of an inflator 10 provided by the invention. The inflator 10 mainly comprises a body 20, a push rod 30, a driving unit 40, an upper cover 50 and a pressure display unit 60.

Figure 2:
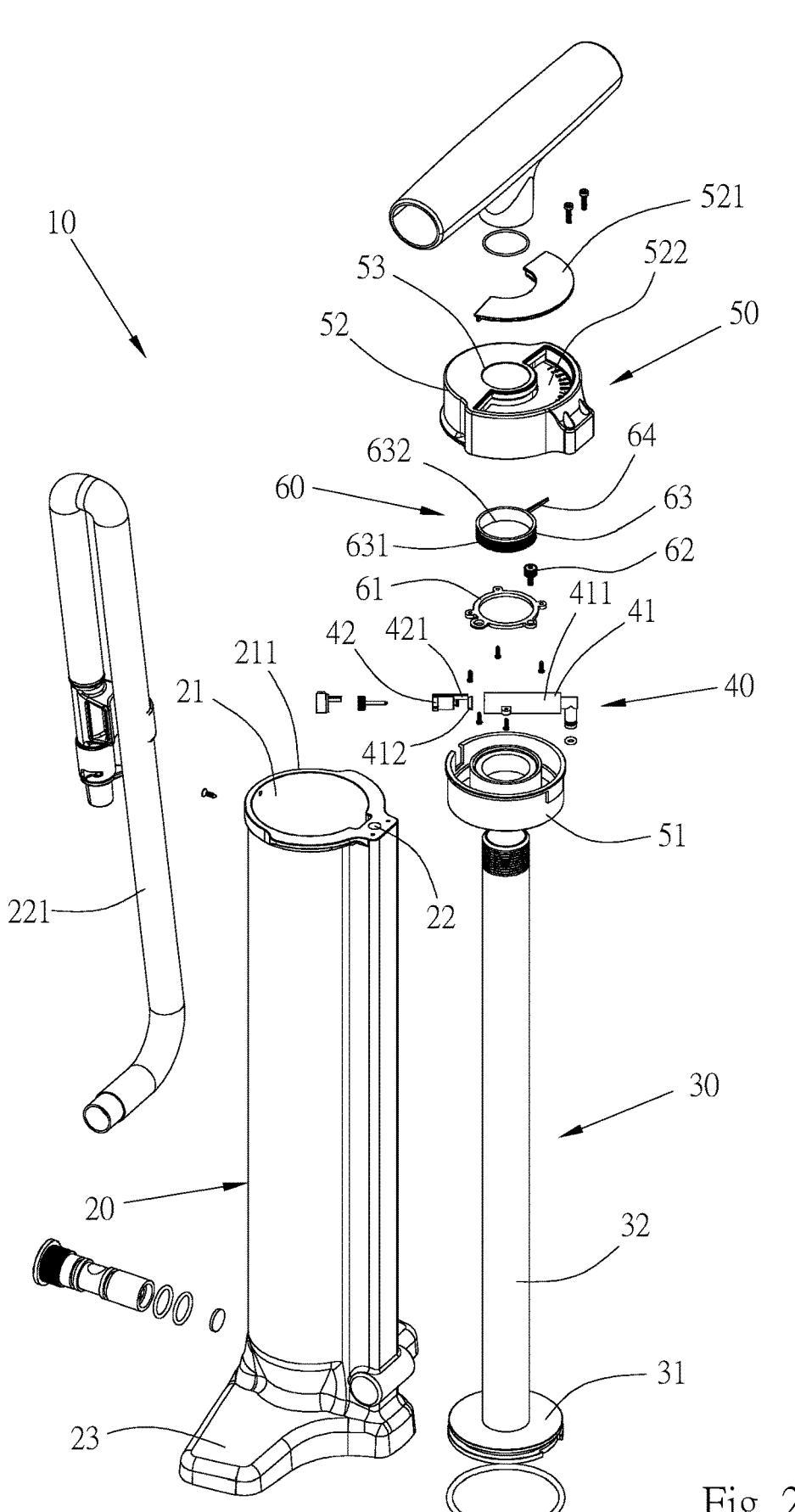
FIG. 2 is an exploded perspective view of the inflator according to a preferred embodiment of the invention.
Figure 3:
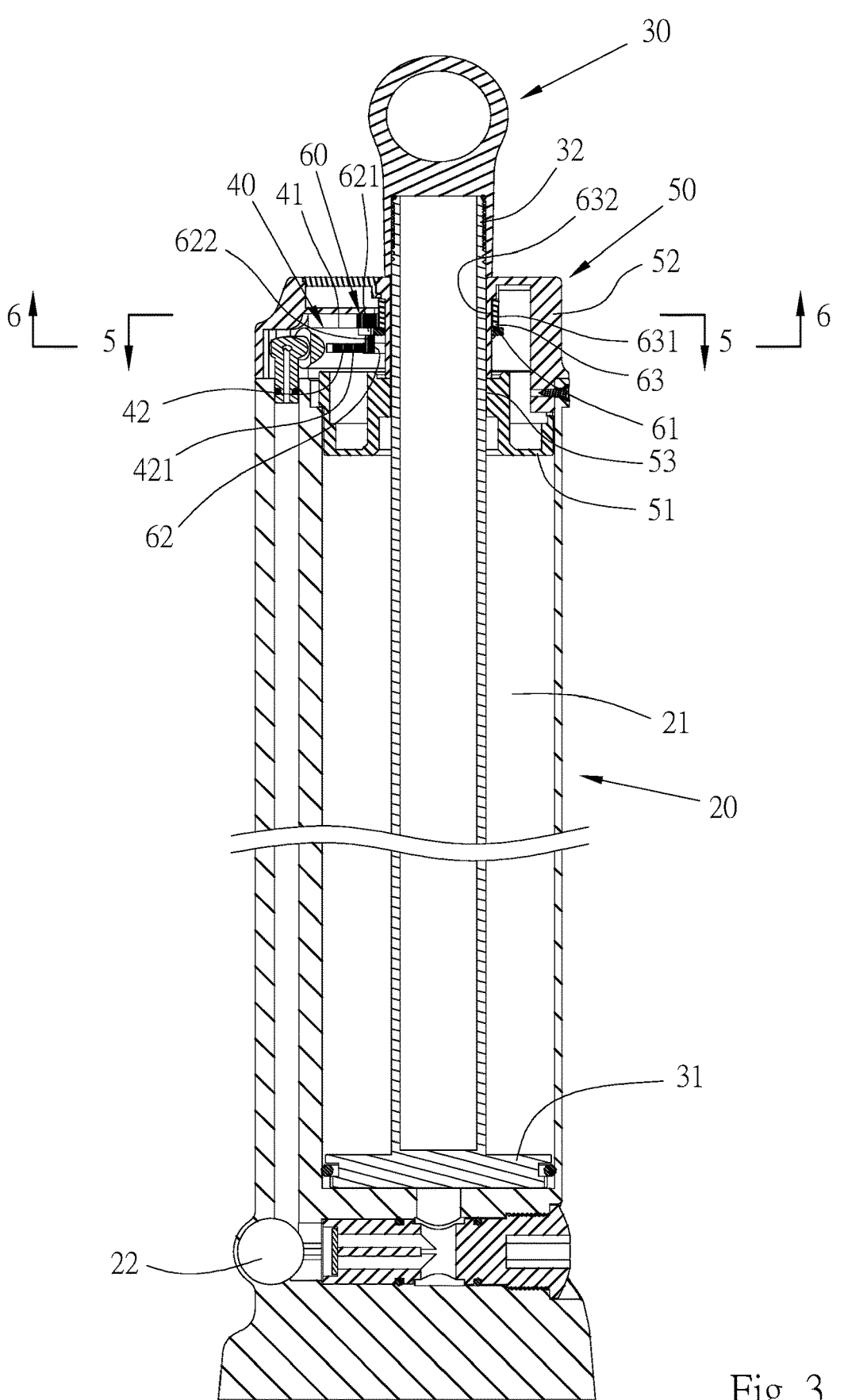
FIG. 3 is a cross-sectional view of the inflator according to a preferred embodiment of the invention.
Figure 4:
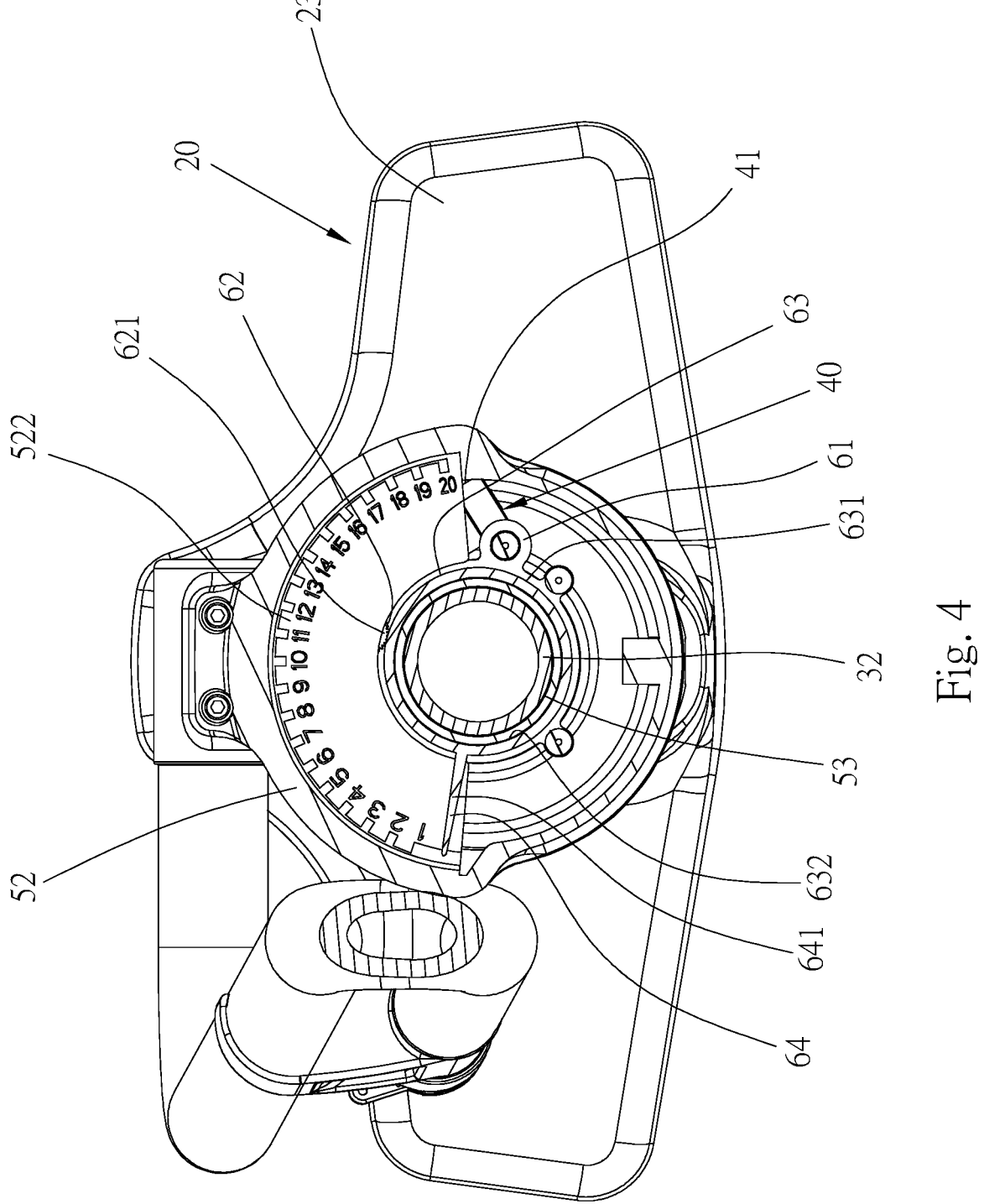
FIG. 4 is a cross-sectional view of an upper cover of the inflator according to a preferred embodiment of the invention.
Figure 5:
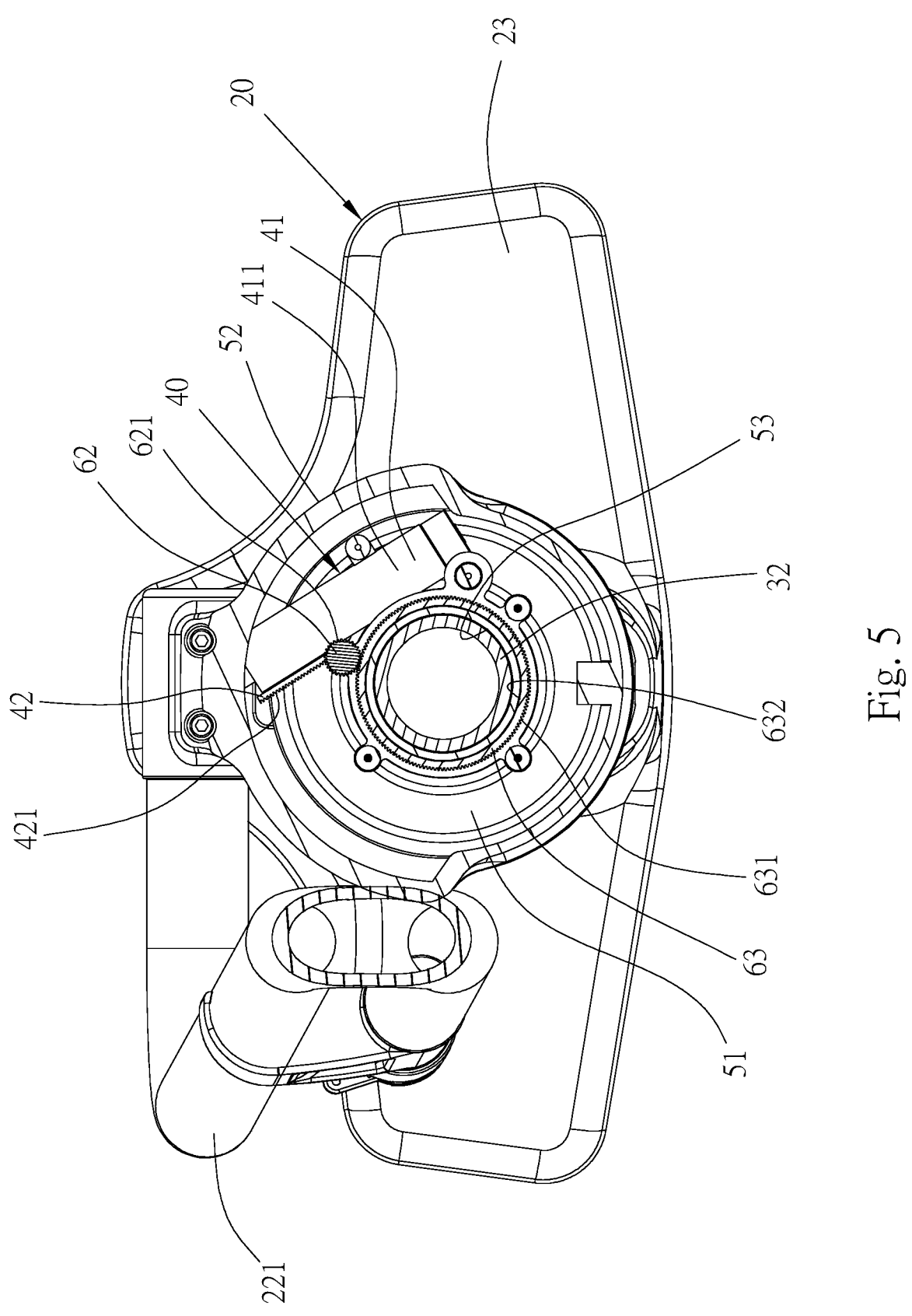
FIG. 5 is another cross-sectional view of the upper cover of the inflator according to a preferred embodiment of the invention.

Please refer to FIGS. 1 and 2. The body 20 has an air chamber 21, a top end of the air chamber 21 is an open end 211; a bottom end of the air chamber 21 is provided with an air outlet channel 22 communicated with the air chamber 21. One end of the air outlet channel 22 is disposed close to the open end 211, another end is connected with an air outlet tube 221, and an end of the air outlet tube 221 can be connected with an inflating joint or other related equipment. A bottom of the body 20 is provided with a support base 23. Structures inside the body 20 are structures of a conventional inflator, which can be replaced by similar structures and thus will not be described herein.

The push rod 30 has a pushing part 31 and a rod body 32. The pushing part 31 is disposed in the air chamber 21 of the body 20, and can be actuated by the rod body 32 to compress the air in the air chamber 21 to form a compressed air effect. After the air in the air chamber 21 is compressed, the compressed air is delivered to a position of the air outlet channel 22, and the air outlet channel 22 delivers the compressed air to the air outlet tube 221 for inflation.

Figure 6:
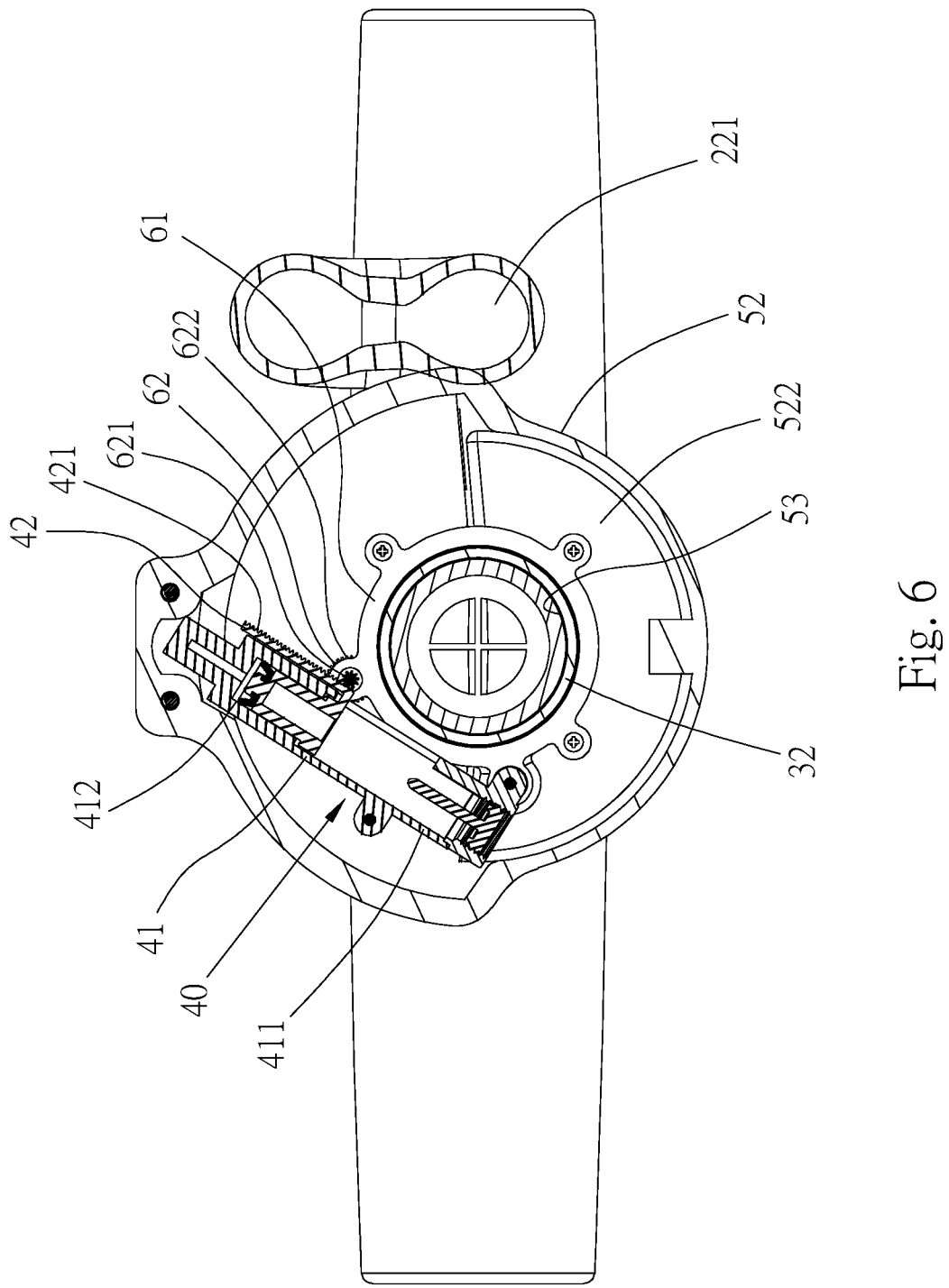
FIG. 6 is a cross-sectional view of the upper cover of the inflator in another direction according to a preferred embodiment of the invention.

Please refer to FIGS. 2 and 6. The driving unit 40 is composed of a piston rod 41 and a driving part 42. The piston rod 41 is communicated with the air outlet channel 22. The piston rod 41 comprises a cylinder 411 and a piston 412. The piston 412 is slidably disposed in the cylinder 411, and the cylinder 411 is connected to the air outlet channel 22, so that the piston 412 is capable of changing its position in the cylinder 411 as a pressure of the air outlet channel 22 changes. The driving part 42 is composed of a rack 421, the rack 421 is disposed on the piston 412 and changes its position along with the piston 412, so that the rack 421 is capable of producing linear reciprocating motions on the piston rod 41 in response to changes in pressure.

The upper cover 50 is covered on the open end 211 of the air chamber 21 of the body 20. The upper cover 50 is formed by assembling a base 51 with a cover body 52. The base 51 is fixedly disposed on the open end 211, the cover body 52 is covered on the base 51, and an accommodation space is formed between the base 51 and the cover body 52. A through hole 53 is formed in a center of the upper cover 50 for the rod body 32 of the push rod 30 to pass through. Moreover, the accommodation space is spaced apart from the through hole 53. A display window 521 is provided on a top of the cover body 52, the display window 521 is a fan-shaped structure, and disposed with the through hole 53 as an axis. The cover body 52 is provided with a numerical value display panel 522 below the display window 521. The numerical value display panel 522 is provided with pressure numerical values, which are also distributed in a fan shape. In addition to disposing the pressure numerical values on the numerical value display panel 522, the pressure numerical values can also be disposed on the display window 521 or at positions suitable for marking on an outer side of the cover body 52.

Please refer to FIGS. 2 to 6. The pressure display unit 60 has a holder 61, a conversion gear 62, a linkage part 63 and a display part 64. The holder 61 is fixed in the accommodation space, the conversion gear 62 and the linkage part 63 are pivotally disposed on the holder 61 and located outside the through hole 53. The conversion gear 62 has a large teeth portion 621 and a small teeth portion 622. A number of teeth of the large teeth portion 621 is greater than a number of teeth of the small teeth portion 622, and the small teeth portion 622 meshes with the rack 421 of the driving part 42. The linkage part 63 is a gear 631 of a hollow ring, the gear 631 meshes with the large teeth portion 621 to enable the driving part 42 capable of driving the conversion gear 62 and then driving the linkage part 63. A center of the gear 631 is provided with a coupling hole 632. The coupling hole 632 enables the gear 631 to dispose around a circumference of the through hole 53 and enables the gear 631 to rotate around the through hole 53 by using the through hole 53 as an axis. The display part 64 is a pointer 641 provided on an outer side of the linkage part 63. The pointer 641 is driven by the linkage part 63 to produce a rotational position change with the through hole 53 as an axis. The pointer 641 is located between the display window 521 of the cover body 52 and the numerical value display panel 522. Through rotation angles of the pointer 641 corresponding to pressure numerical values displayed at different positions of the numerical value display panel 522, a pressure numerical value correspondingly indicated by the pointer 641 can be observed through the display window 521. The display part 64 can also be disposed on an inner side of the linkage part 63 to produce an indication toward the through hole 53.

Figure 7:
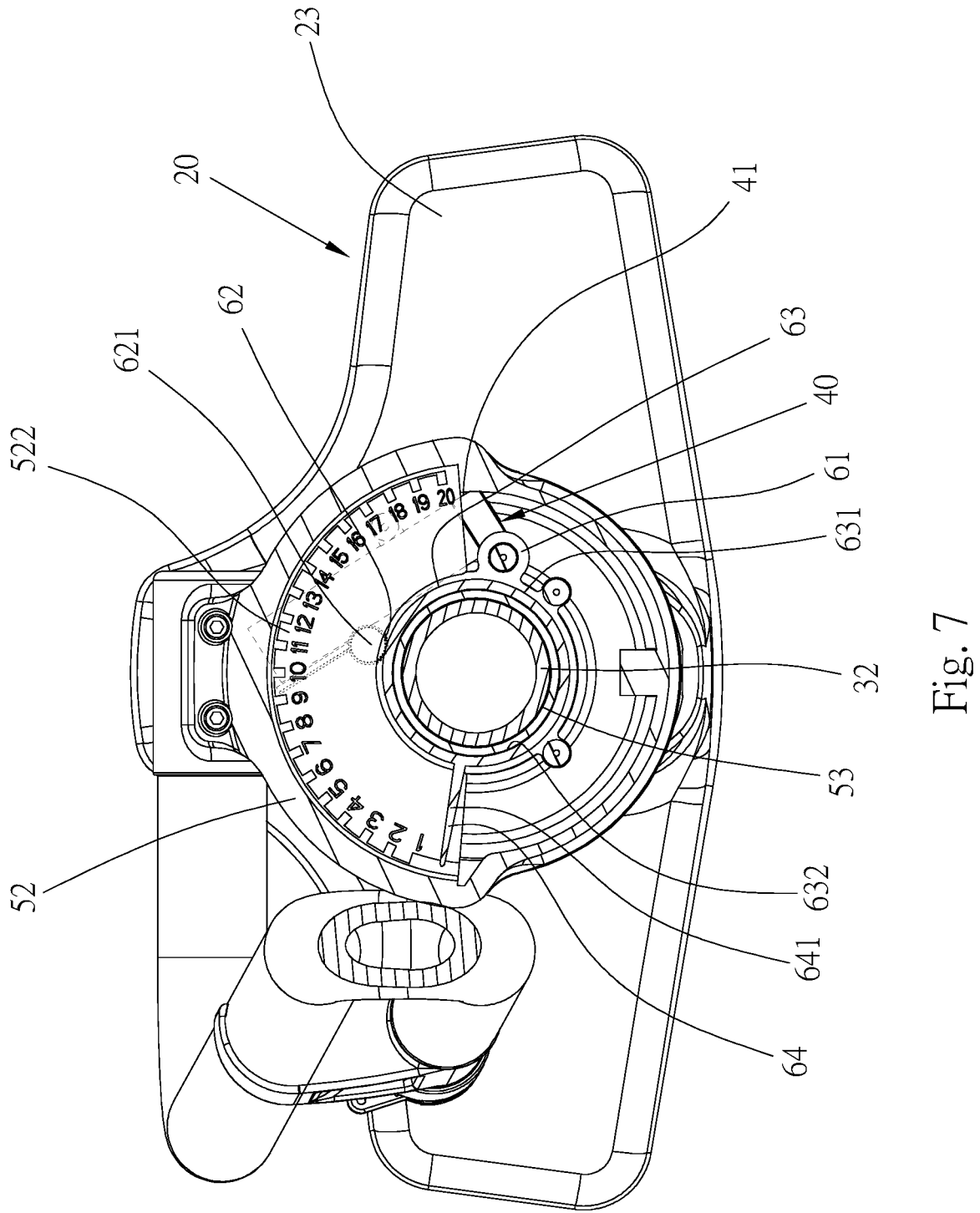
FIG. 7 is a cross-sectional view of numerical value display of the inflator before inflating according to a preferred embodiment of the invention.
Figure 8:
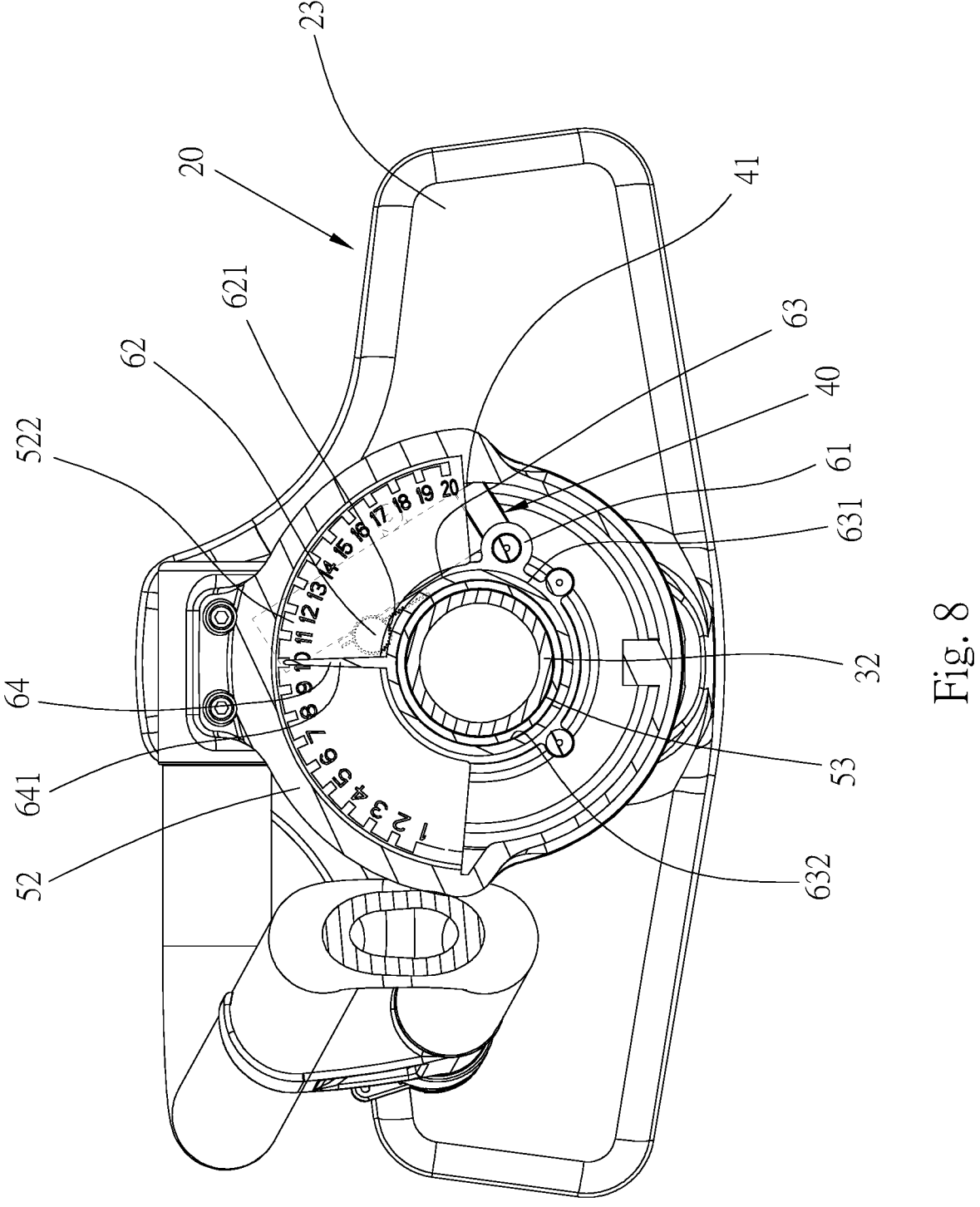
FIG. 8 is a cross-sectional view of numerical value display of the inflator during inflating according to a preferred embodiment of the invention.

Please refer to FIGS. 7 and 8. During use, a user can set the support base 23 of the body 20 on the ground or other fixed locations, and fix the support base 23 through stepping by foot or other means. Then, the user holds the rod body 32 of the push rod 30 with both hands and pumps air by pulling and pushing the rod body 32 back and forth in the air chamber 21 of the body 20 so that the air can be continuously compressed through the pushing part 31, the compressed air is delivered to the air outlet channel 22, inflation effect can be achieved through the air outlet tube 221 and the compressed air is delivered to the driving unit 40 through the air outlet channel 22. The piston rod 41 will form a pushing stroke change under an action of air pressure, and the piston rod 41 drives the rack 421 of the driving part 42 to change position. When the rack 421 performs linear displacement, the small teeth portion 622 meshed with the rack 421 rotates relatively and synchronously drives the large teeth portion 621 to rotate. The large teeth portion 621 drives the gear 631 of the linkage part 63, and the gear 631 rotates with the through hole 53, that is, a center of the rod body 32, as an axis, so that the pointer 641 of the display part 64 rotates along with the gear 631 to indicate a corresponding air pressure numerical value displayed on the numerical value display panel 522. Thereby enabling the user to directly observe changes in a pressure numerical value while inflating with the push rod 30, without stopping an inflating action for observation. Since the pressure display unit 60 is disposed in the upper cover 50, an overall structure can be simplified and a volume of installation can be reduced. The pressure display unit 60 does not protrude from the body 20 or additionally require an externally connected pressure gauge.

After the above inflating process is completed and there is no object connected to the air outlet tube 221 and the air can be discharged freely, the piston 412 of the piston rod 41 will return to an original unpressed state, so that the rack 421 of the driving part 42 will also return to a starting position, and the linkage part 63 will rotate relatively and drive the pointer

641 to return to a position of numerical value of zero, waiting for a next air pressure driving action.

Although the invention has been disclosed as above with the embodiment, it is not intended to limit the invention. A person having ordinary skill in the art to which the invention pertains can make various changes and modifications without departing from the spirit and scope of the invention. Therefore, the scope of protection of the invention shall be subject to what is defined in the pending claims.

What is claimed is:

1. An inflator with an upper cover showing a pressure value, comprising:

a body with an air chamber, one end of the air chamber being an open end; an air outlet channel communicated with the air chamber;

a push rod having a pushing part and a rod body; the pushing part being disposed in the air chamber and capable of being actuated by the rod body to compress the air chamber;

a driving unit provided with a driving part, the driving unit being communicated with the air outlet channel to enable the driving part to operate by pressure changes of the air outlet channel;

an upper cover covered on the open end of the air chamber of the body, the upper cover being provided with a through hole; the rod body of the push rod is inserted in and is moveable in the through hole; and a pressure display unit disposed in the upper cover, the pressure display unit having a linkage part and a display part; the linkage part being linked with the driving part and the linkage part being able to move around the through hole, and the display part being driven by the linkage part to produce a rotational position change around the through hole as an axis, the linkage part and the display part are positioned outside of the through hole.

2. The inflator as claimed in claim 1, wherein the driving unit is a piston rod, the driving part is a rack, the linkage part is a gear; the piston rod is subjected to pressure changes of the air outlet channel to drive the rack of the driving part to move, and the gear of the linkage part is driven to rotate by the rack of the driving part.

3. The inflator as claimed in claim 2, wherein the pressure display unit further comprises a conversion gear, the conversion gear has a large teeth portion and a small teeth portion, the large teeth portion meshes with the gear of the linkage part, and the small teeth portion meshes with the rack of the driving part.

4. The inflator as claimed in claim 3, wherein the pressure display unit further comprises a holder, the conversion gear and the gear of the linkage part are pivotally disposed on the holder; the holder is fixed to the upper cover.

5. The inflator as claimed in claim 2, wherein a coupling hole is provided in a center of the gear of the linkage part, and is coaxially disposed around a circumference of the through hole of the upper cover.

6. The inflator as claimed in claim 2, wherein the piston rod comprises a cylinder and a piston; the piston is slidably disposed in the cylinder, the cylinder is connected to the air outlet channel, the piston is capable of changing its position in the cylinder as a pressure of the air outlet channel changes; the rack of the driving part is disposed on the piston and changes its position along with the piston.

7. The inflator as claimed in claim 2, wherein the display part is a pointer, the pointer rotates with a center of the through hole of the upper cover as an axis; the upper cover is provided with a display window.

8. The inflator as claimed in claim 7, wherein the upper cover comprises a base and a cover body; the base is fixedly disposed on the open end of the body, the cover body is covered on the base, an accommodation space is formed between the base and the cover body; the pressure display unit and the driving unit are disposed in the accommodation space.

9. The inflator as claimed in claim 8, wherein the cover body is provided with a numerical value display panel therein at a position below the display window, and the pointer of the display part is disposed between the display window and the numerical value display panel.

10. The inflator as claimed in claim 1, wherein the display part is a pointer, the pointer rotates with a center of the through hole of the upper cover as an axis; the upper cover is provided with a display window.

11. The inflator as claimed in claim 10, wherein the upper cover comprises a base and a cover body; the base is fixedly disposed on the open end of the body, the cover body is covered on the base, an accommodation space is formed between the base and the cover body; the pressure display unit and the driving unit are disposed in the accommodation space.

12. The inflator as claimed in claim 11, wherein the cover body is provided with a numerical value display panel therein at a position below the display window, and the pointer of the display part is disposed between the display window and the numerical value display panel.

* * * * *